United States Patent [19]

Kiya et al.

[11] Patent Number: 5,113,359
[45] Date of Patent: May 12, 1992

[54] METHOD FOR SELECTING INPUTS FOR A PC IN WHICH A LADDER PROGRAM IS SIMULATED

[75] Inventors: Nobuyuki Kiya; Kimio Maeda, both of Hachioji; Yoshiharu Saiki, Minamitsuru, all of Japan

[73] Assignee: Fanuc Ltd., Minamitsuru, Japan

[21] Appl. No.: 397,464

[22] PCT Filed: Jan. 6, 1989

[86] PCT No.: PCT/JP89/00008
§ 371 Date: Aug. 21, 1989
§ 102(e) Date: Aug. 21, 1989

[87] PCT Pub. No.: WO89/06388
PCT Pub. Date: Jul. 13, 1989

[30] Foreign Application Priority Data

Jan. 8, 1988 [JP]    Japan ................. 63-002147

[51] Int. Cl.⁵ .............................................. G06F 15/00
[52] U.S. Cl. ..................... 364/578; 364/147; 395/161
[58] Field of Search ............... 364/147, 149, 578, 200, 364/900, 505, 506, 521

[56] References Cited

U.S. PATENT DOCUMENTS

| | | | |
|---|---|---|---|
| 4,149,235 | 4/1979 | Froyd et al. ........................ | 364/578 |
| 4,217,658 | 8/1980 | Henry et al. ..................... | 364/147 X |
| 4,413,314 | 11/1983 | Slater et al. ..................... | 364/138 X |
| 4,586,035 | 4/1986 | Baker et al. ..................... | 340/706 X |
| 4,623,961 | 11/1986 | Mackiewicz ..................... | 364/900 X |
| 4,716,541 | 12/1987 | Quatse .............................. | 364/900 |
| 4,935,886 | 6/1990 | Choka .............................. | 364/578 |
| 4,941,081 | 7/1990 | Kumar et al. ................... | 364/147 X |
| 4,991,076 | 2/1991 | Zieferer et al. ............. | 364/551.02 X |

FOREIGN PATENT DOCUMENTS

| | | |
|---|---|---|
| 3431076 | 3/1986 | Fed. Rep. of Germany ...... 364/578 |
| 0033504 | 2/1984 | Japan . |
| 0105605 | 5/1986 | Japan . |
| 2029986 | 3/1980 | United Kingdom . |

OTHER PUBLICATIONS

Fouch, W. H., "A New Generation of Programmable Controls", *Plastics Engineering*, vol. 31, No. 3, Mar. 1975, pp. 41-43.

*Primary Examiner*—Joseph L. Dixon
*Attorney, Agent, or Firm*—Staas & Halsey

[57] ABSTRACT

A simulation method for a programmable controller (PC) is provided in which a ladder program (22) of a PC is simulated. A cursor (1) is set at a relay contact on a screen (42a) displaying the ladder program (22) to directly change the input signal. A logical process is performed on the input signal (5) and an input signal (6) from a machine to simulate the ladder program (22). By setting the cursor at a contact to be changed on the ladder program and operating the software keys, a simulation of the ladder program corresponding to actual machine movements can be executed. Since the input can be changed directly on the ladder program, the simulation can be efficiently performed.

2 Claims, 3 Drawing Sheets

METHOD FOR SELECTING INPUTS FOR A PC IN WHICH A LADDER PROGRAM IS SIMULATED

BACKGROUND OF THE INVENTION

The present invention relates to a simulation method for a programmable controller (PC), more particularly, the present invention is directed to a simulation method for a PC which performs a logical process on a signal from a screen displaying a ladder program and a signal from a machine, and uses the result as an input signal.

A PC (programmable controller) must be connected to a machine to confirm a created ladder program, etc. If the ladder program is incomplete the machine operation is not complete, and thus only a part of the program can be simulated.

Desirably, simulators are connected to simulate a part of a program that cannot be simulated using the machine. This means that simulators should be prepared at all times, and if a large number of ladder programs are involved, it is difficult to always provide such simulators. Accordingly, a method has been employed in which the input/output is controlled by a keyboard, etc., of a program editing apparatus, to simulate the ladder program.

In the prior art method, however, since the input/output is controlled by using alphabetic or numerical keys of the keyboard, it is difficult to intuitively grasp the relationship with the ladder program, and accordingly, much time is required and setting errors frequently occur.

Further, a satisfactory simulation cannot be achieved if a simulation using a machine and a simulation using the program editing apparatus are carried out separately.

SUMMARY OF THE INVENTION

In view of the foregoing, the object of the present invention is to provide a simulation method for a PC which performs a logical process on a signal from a screen displaying a ladder program and a signal from a machine, and uses the result as an input signal.

To achieve the above object, the present invention provides a simulation method for a PC where a ladder program of a PC (programmable controller) is simulated. The method of the present invention comprises setting a cursor at a relay contact on a screen displaying a ladder program, for a directly changing an input signal, and performing a logical process on the input signal and an input signal from a machine to simulate the ladder program.

The ladder program is displayed on the screen, and the cursor can be set at a relay contact to change the same, whereby the signal to be changed can be clearly recognized, and thus the simulation efficiency is improved and errors are eliminated.

Furthermore, the input signal from the display screen displaying the ladder program and the input signal from the machine are subjected to a logical process, e.g., an AND process, and the result is used as an actual input signal. Therefore, it is possible to carry out a satisfactory simulation through a selection of the signals from the display screen and the machine.

DESCRIPTION OF THE PREFERRED EMBODIMENT

An embodiment of the present invention will be described with reference to the drawings.

Figure 1:
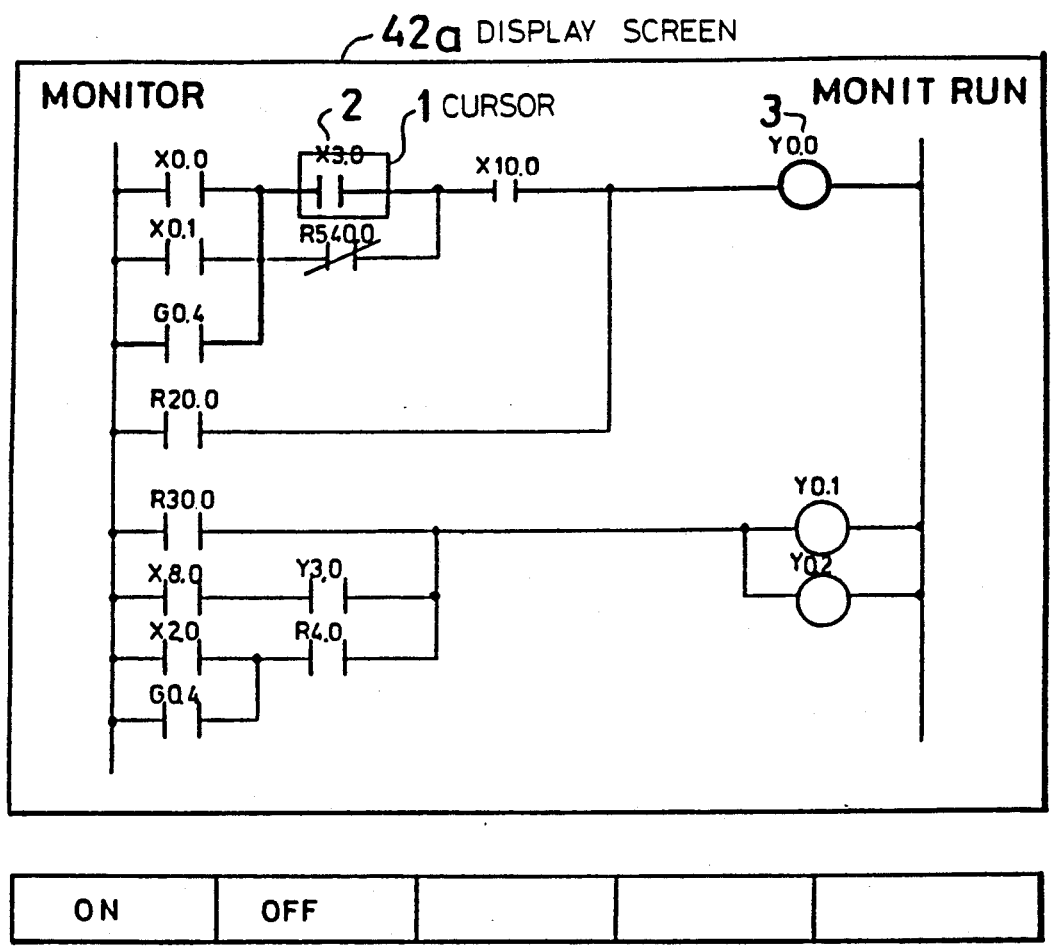
FIG. 1 is a diagram of a screen displaying a ladder program according to one embodiment of the present invention.

FIG. 1 is an example of a screen displaying a ladder program according to one embodiment of the invention. In the figure, 42a denotes a display screen of a program editing apparatus, on which a ladder program is displayed, and 1 denotes a cursor which can be moved on the screen by cursor keys, not shown.

To turn on a relay contact (X3.0) 2, the cursor 1 is moved to the contact (X3.0) 2 and then an ON button of software keys 42c is pressed, whereby the contact (X3.0) 2 and a coil (Y0,0) 3 are turned ON and the corresponding line becomes a bold line. The figure shows a state after the line is changed. To turn off the contact, only an OFF button of the software keys 42c need be pressed. When the contact (X3.0) 2 is turned ON, this state is stored and retained in an internal RAM.

Instead of using the software keys as described above, hardware keys may be used to turn the contact ON and OFF.

By thus setting the cursor at a contact to be changed on the ladder program and operating the software keys, a simulation of the ladder program can be executed. Since the input can be changed directly on the ladder program, the simulation can be efficiently performed.

Now, means for performing a logical process on the input from the display screen and the input signal from a machine will be described. There is a limit to input signals from the display screen when carrying out a simulation for all machines, as mentioned above. At the same time, if the ladder program is incomplete, not all of the signals from the machine can be brought to a condition necessary for simulation, and therefore, the signals from the display screen and the signals from the machine are selectively used to carry out the simulation. Specifically, the signals from the machine are used when the machine can provide signals necessary for the simulation, and the input signals from the display screen are used when the machine signals are incomplete, to carry out the simulation.

Figure 2:
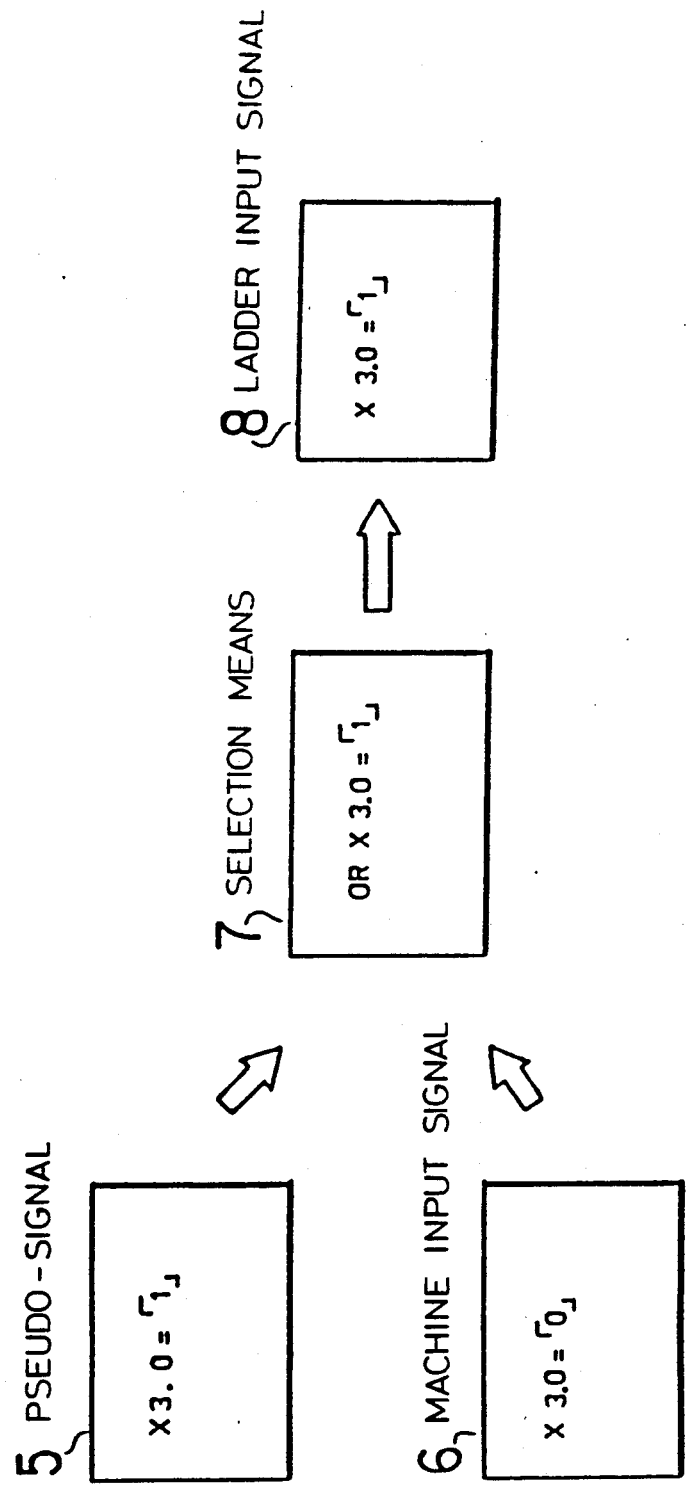
FIG. 2 is a diagram of a process for the selection of signals from a machine and from a display screen.

FIG. 2 is a diagram of a logical process for selecting signals from the machine and from the display screen. In FIG. 2, 5 denotes an input signal from the display screen, i.e., a pseudo-signal, and 6 denotes a machine input signal actually supplied by the machine. A selection means 7 determines which of these signals should be selected. To carry out the selection, the following methods can be used.

A first method preferentially selects the pseudo-signal 5, which is used when a signal is not supplied by the machine. A second method preferentially selects the machine input signal 6. This method is used when the signals from the machine can be used. A third method obtains an AND of the two signals. This method is applied to a signal which is ON when the machine input signal 6 is effective. A fourth method obtains an OR of the two signals. This method is implemented when both signals are to be used.

One of the above methods is selected and set for each signal. FIG. 2 shows an example of the process of obtaining an OR of the two signals for the signal X3.0. The selection method is similarly determined for processing other input signals. Numeral 8 denotes a ladder input signal which is processed as an actual input signal by the ladder program. The ladder program reads this signal and carries out a ladder program process.

Figure 3:
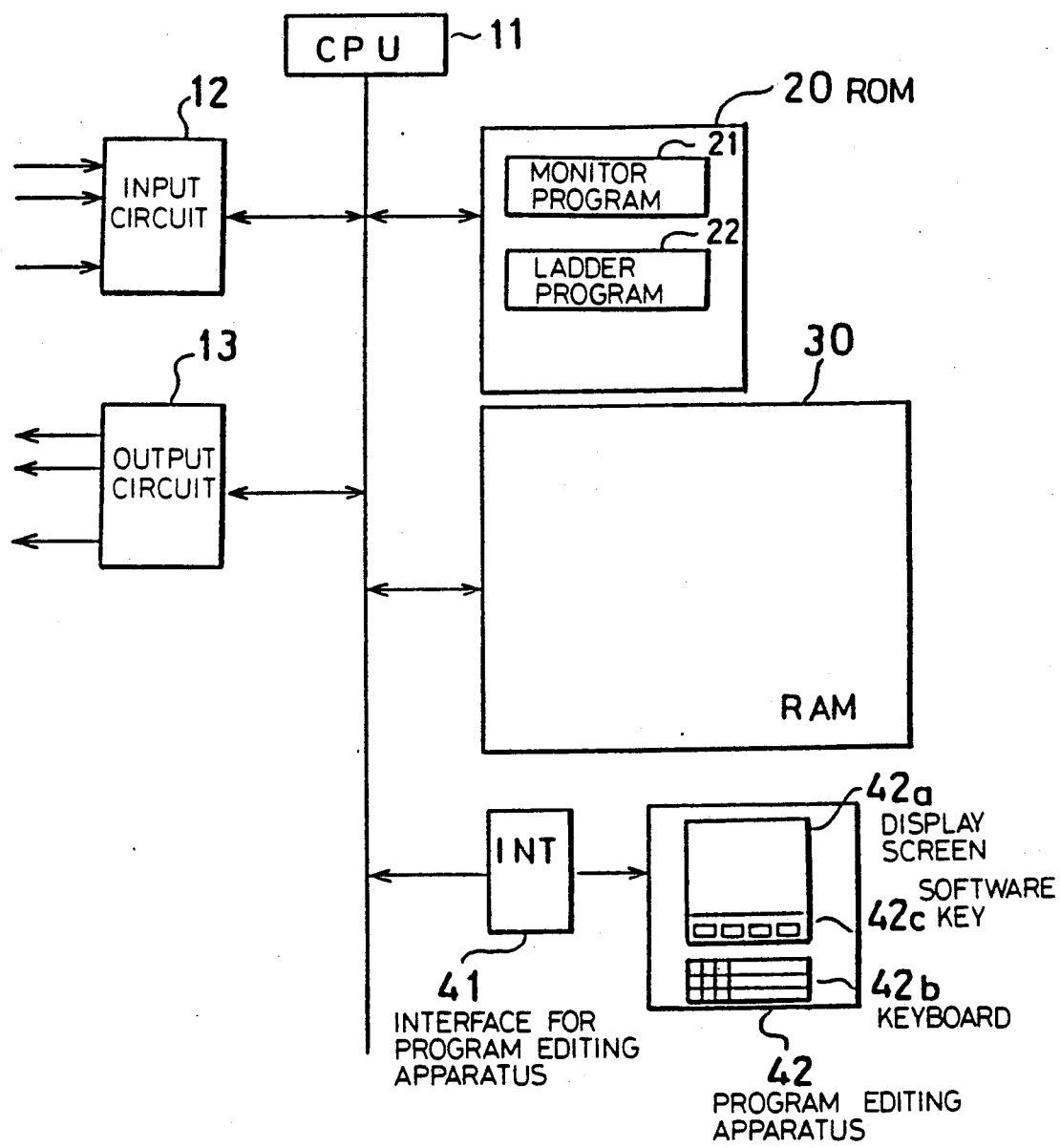
FIG. 3 is a block diagram of an arrangement of a PC (programmable controller) for carrying out the invention.

FIG. 3 is a block diagram of the arrangement of a PC (programmable controller) for carrying out the present invention. In the figure, 11 denotes a processor for global control of the PC (programmable controller), 12 denotes an input circuit which receives signals external signals and, after changing the signal level, transfers them to a bus, and 13 denotes an output circuit for outputting internally produced signals. Although not illustrated, a machine is connected to the input circuit 12 and the output circuit 13. A ROM 20 stores a monitor program 21 for monitoring the execution of the ladder program (control program), and a ladder program 22 controls a machine tool, etc., and the like. A RAM 30 stores various data, including the states of the contacts input by simulation. An interface 41, for a program editing apparatus comprises an interface circuit for connecting the bus and the program editing apparatus. The program editing apparatus 42 is used to create, debug, and simulate the ladder program 22. Numeral 42a denotes the display screen, 42b denotes a keyboard, and 42c denotes software keys.

In the foregoing description, the simulation is carried out by the program editing apparatus connected to the PC (programmable controller). It can also be carried out by using an off-line program creating apparatus separate from the PC.

As described above, according to the present invention, the input can be changed directly on the ladder program displayed on the screen, and a simulation is carried out through a selection of this input and the signal from the machine, whereby a simulation corresponding to actual machine movements can be performed.

We claim:

1. A method for selecting inputs for a programmable controller (PC) in which a ladder program is simulated, the PC being connected to a machine, said method comprising the steps of:
 a) displaying a ladder program on a display screen;
 b) setting a cursor at a relay contact on the screen to change an input signal to the ladder program;
 c) inputting machining signals supplied by the machine for performing a simulation;
 d) inputting input signals from the display screen when the machining signals are incomplete, for performing a simulation; and
 c) selecting the machining signals and the input signals for performing a simulation of the ladder program, said step e) comprising the substeps of:
  i) selecting an input signal when a machining signal is not supplied;
  ii) selecting the machining signal when a machining signal is supplied by the machine;
  iii) performing an AND operation on the machining signal and input signal when the machining signal is supplied and is to be employed; and
  iv) performing an OR operation on the machining signal and input signal when both the machining signal and input signal are employed in the simulation.

2. A method for selecting inputs for a programmable controller (PC) according to claim 1, wherein said steps c) and d) are performed using a logic operation.

* * * * *